United States Patent [19]
Lechner

[11] 3,928,795
[45] Dec. 23, 1975

[54] CONTACT TESTER
[75] Inventor: Robert Lechner, Feldgasse, Austria
[73] Assignee: Siemens Aktiengesellschaft, Berlin & Munich, Germany
[22] Filed: May 6, 1974
[21] Appl. No.: 467,154

[30] Foreign Application Priority Data
May 7, 1973 Germany............................ 2322961

[52] U.S. Cl. ........................... 324/28 CR; 317/157
[51] Int. Cl.² ......................................... G01R 31/02
[58] Field of Search ........ 324/28 R, 28 CB, 28 CR; 178/69; 179/175.1; 317/157

[56] References Cited
UNITED STATES PATENTS
3,464,001  8/1969  Dodson .......................... 324/28 CR Primary Examiner—Alfred E. Smith
Assistant Examiner—Michael J. Tokar

[57] ABSTRACT

The contact being tested is inserted into a bridge circuit, in whose arms as well as in the current feed and current output there are arranged coupling contacts of an access matrix. Monitoring of the maximum resistance allowed of all the contacts is accomplished by comparing the voltage drop with reference voltages via three comparators. The bridges are fed from three constant-current sources.

3 Claims, 1 Drawing Figure

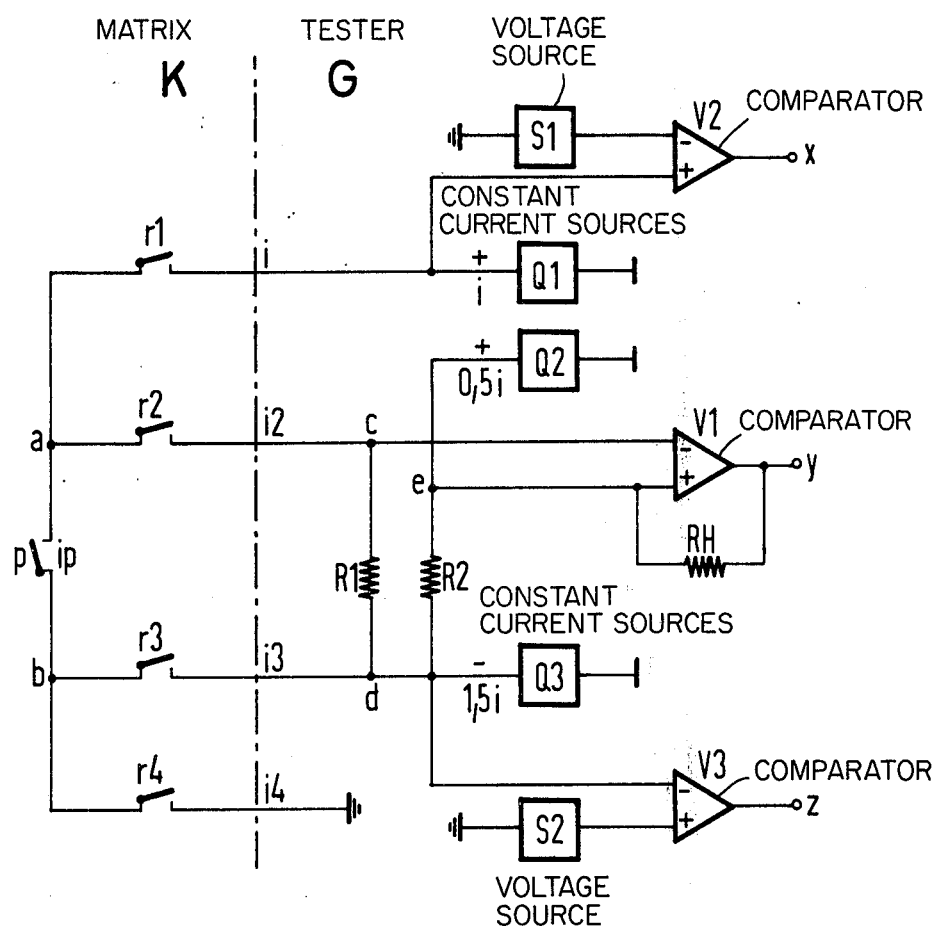

CONTACT TESTER

BACKGROUND OF THE INVENTION

The invention relates to a tester for rapidly sampling the circuit condition of a switch contact which is connected to a tester over line resistances by measuring the transfer resistance of the contact with very low voltage.

To examine the condition of contacts which, for example, have been in service for some time or have just left the production line, it is practical to work with very low voltages of, say, a few millivolts. A coherer effect, i.e., the buildup of a bridge of conductive metal, occurs with greater voltages which would destroy or bridge over an oxide film that in certain circumstances exists on the contacts. As a result, the condition of the contacts and of the contact surface being examined would be altered irreversibly, and the subsequent measurements would yield incorrect data. Therefore, in the case of contacts over which only uncohered weak speech currents are carried it is necessary to test with very low voltages, which do not affect the surface texture of the contacts.

However, in such a test the resistance of the connecting lead over which the contacts being tested are connected in a sequence prespecified by the tester, becomes noticeable. Likewise, the line and the contacts contained therein may have undesirably high resistances which invalidate the test result.

It is, therefore, an object of the invention to provide a tester which will make it possible, by measuring the transfer resistance of a contact, to sample rapidly and securely the circuit condition of that contact.

It is another object of the invention to provide such a tester which will keep the duration of a full measurement to a minimum.

SUMMARY OF THE INVENTION

In accordance with the invention, the foregoing and other objects are achieved in that the switching contact being tested is arranged in a bridge circuit which contains in each opposing bridge arm the contact being tested and a measuring resistor, as well as a first and a second coupling contact. The bridge circuit is connected to a power supply with the positive output of a first constant-current source on one side of the contact being tested over a third coupling contact and the other side of the contact being tested is grounded over a fourth coupling contact. A second reference resistor is provided for supplying the reference voltage for the measuring resistor. This second reference resistor is connected to the positive output of a second constant-current source, and to the bridge circuit facing the power supply to which the measuring resistor is likewise connected. A constant-current source, which can supply as much current as the two other constant-current sources combined, is connected with its negative side to the system at the last-mentioned side of the bridge circuit. The last-mentioned side of the bridge circuit is connected to a first comparator for comparing the voltage generated thereat with a first threshold voltage source. The two ends of the measuring resistor which are not placed with the side of the bridge circuit facing the power supply and of the measuring resistor are connected to a second rapid comparator. The positive output of the first constant-current source is connected to a third comparator for comparing the voltage generated thereat with a second threshold voltage source.

The invention employs constant-current sources, of which two supply current of a positive polarity and one of a negative polarity to the bridge circuit. As a result, for a resistance value of the contact being tested which is equal to that of the measuring resistor, the overall current feed is zero. In this way, if the measuring voltage is very low the threshold value forming the tolerance limit is determined with precision.

Because in addition to the minimally required two coupling contacts further coupling contacts are provided, aside from the connecting lead, which are included in the measurement procedure, the transfer resistors of all the coupling contacts essential for determining the measured value are monitored together therewith in each measurement. Thus, it is not possible that the measured value could be invalidated without notice by these contacts, which are required for rapid measuring. By selecting a measuring resistor dimensioned in accordance with the tolerance limit of the contact being tested and the associated reference resistor, the tester can quickly be changed to other limiting values, if this should prove necessary. This can be done very easily if one takes advantage of the possibility afforded by a further development of the invention of providing the measuring resistor with the same dimensions as the reference resistor.

BRIEF DESCRIPTION OF THE DRAWING

The principles of the invention will be more readily understood by reference to the description of a preferred embodiment given hereinbelow in conjunction with the accompanying single FIGURE drawing which is a schematic diagram of a tester constructed according to the invention.

This form of construction of the invention is a computer-controlled automatic tester which enables a rapid determination of the circuit condition of a contact. However, the invention can also be used with equal success in other slower testers, though not with the same efficiency.

DETAILED DESCRIPTION OF THE DRAWING

The drawing shows only those details of an automatic tester G which are essential for understanding the invention. Also mentioned are the resistors of the feeder lines, which are monitored together with the coupling contacts and are taken into account during the measurement.

A contact $p$ being tested is connected to the tester G over a matrix K of known construction, of which four coupling contacts $r1$, $r2$, $r3$ and $r4$ are shown.

The tester G contains three commonly known comparators $V1$, $V2$, $V3$ constructed as operational amplifiers. A comparator $V1$ was selected as a high-speed device, so that the closing of the contact p can be detected as accurately as possible. The non-inverting input + of the comparator $V1$ is fed back over a resistor $RH$ from an output $y$.

A voltage source $S1$ is connected to the inverting input of comparator $V2$; this source supplies a reference voltage which will not be exceeded at the positive output of a constant-current source $Q1$.

Similarly, a voltage source $S2$ is connected to the non-inverting input of the comparator $V3$. The voltage generated by this voltage source will not be exceeded either. If a voltage is exceeded and it is detected, an interfering signal appears at the inputs $x$ or $z$, which calls the attention of the testing person to an excessive resistance value of the coupling contact $r1$ and $r2$ or $r3$.

The tester G comprises three other commonly known constant-current sources Q1, Q2, and Q3.

The constant-current source Q1 is connected to frame with its negative side, while its positive side, in addition to being connected with the comparator V2 (having a non-inverting input) described hereinabove, is likewise connected over the coupling contact $r1$ to the connecting point $a$ of the bridge.

The constant-current source Q2 is likewise connected to frame with its negative output. Its positive output leads over a point $e$ to the non-inverting input of the comparator V1 and to a resistor R2. The other side of said resistor R2 is connected to point $d$. To this point are also connected the inverting input of the comparator V3, the negative output of the constant-current source Q3, over the switching contact $r3$, the connecting point $b$ and the resistor R1.

The other side of the resistor R1, at point $c$, is connected to the inverting input of the comparator V1 and over the switching contact $r2$ to the connecting point $a$.

The contact $p$ being tested is situated between the connecting points $a$ and $b$. Point $b$ is moreover connected to frame over the switching contact $r4$ in the tester G.

For a test it is determined that the resistance of the contact $p$ to be tested shall not exceed a specified value. If a comparatively large resistance value is measured, the contact is considered as open, in the case of a smaller resistance value, it is considered as closed. The closing instant of said contact $p$ is also of particular interest for the overall test.

A bridge is constructed between points $a$, $b$, $c$, and $d$, in which is situated the resistor R1 facing the contact $p$. In this example, this resistor is designed with exactly the same maximally allowable resistance value of the contact $p$ in closed condition.

The voltage drop being formed at the measuring registor R1 is carried over point $c$ to the comparator V1, just as the voltage drop at point $e$ of the reference resistor R2.

Let it be assumed that the resistances of the coupling contact $r1$, $r2$ and $r3$ are negligibly small and that the resistance of the contact $p$ would reach the maximum value allowed, which equals the value of the resistors R1 and R2. In this case, an impressed current $i$ flows from the constant current source Q1 to the bridge as is evenly distributed thereat to both arms comprised of the resistors $p$ and R1. Thus, the currents $ip$ and $i2$ are equally large, each having a value of $0.5\ i$.

The constant-current source Q2 feeds the resistor R2 with an impressed current of $0.5\ i$, so that the same voltage drop arises at the resistors R1 and R2. Therefore, the same potential prevails at points $c$ and $e$, which is evaluated accordingly by the comparator V1.

The two currents generated by the constant-current sources Q1 and Q2 unite at a point $d$ to form a total current of $1.5\ i$, which is received by the constant-current source Q3.

The current and resistance conditions prevailing heretofore exist on condition that all the coupling contacts $r1$ to $r4$ have the same negligible resistance value. Under this condition, no current flows over the coupling contact $r4$, i.e. that $i4$ equals 0.

If the resistance of the contact $p$ being tested is less than R1, the major portion of the current $i$ flows as current $i3$ to point $d$ over the coupling contact $r3$. In this case, the voltage at point $c$ is less than that at point $e$.

If the resistance of the contant $p$ is greater than R1, because the contact is open or because there is an excessive transfer resistance, a higher voltage is generated at point $c$ than at point $e$, and the comparator V1 reacts accordingly.

The purpose of the constant-current source Q1 is to adhere to an unaltered current $i$ independently of the resistances in the closed circuit. If the resistors increase along the line, a higher voltage arises across the output of the constant-current source Q1 and vice versa; this is exploited by the comparator V2. With the contact $p$ open and with negligible resistances of the coupling contacts $r1$ and $r2$, practically the same voltage exists across the output of the constant-current source Q1 as at point $c$, but if the resistance of the coupling contact $r1$ or $r2$, or of both contacts, exceeds a prescribed value, this becomes noticeable in an increase in the voltage across the constant-current source Q1. The forementioned value also appears at the non-inverting input of the comparator V2, which detects an overvoltage with respect to the reference voltage S1, so that the comparator V2 indicates at the output $x$ an error in the coupling contacts $r1$ and $r2$. The current $i4$ continues to be zero.

If, with the contact $p$ closed, the coupling contact $r3$ has an excessive resistance, a portion of the current $i$ generated by the constant-current source Q1 flows to earth over the coupling contact $r4$ in the form of the current $i4$, thereby disturbing the current balance of the three constant-current sources. Due to the voltage drop at the coupling contact $r3$ at point $d$, there arises a voltage which exceeds the maximum value allowed. The comparator V3 picks up, indicating at its output $z$ the presence of an excessive transfer resistance at the coupling contact $r3$.

The resistance of the coupling $r4$ is not monitored with the switching arrangement shown herein, because it cannot invalidate the test result of contact $p$, but the monitoring takes place in another switching arrangement, which bears no relationship to the invention and which will not be described herein.

Thus far, we have indicated that the resistance value of resistor R1 equals that of resistor R2. However, another value may be selected for R2, but in this case the impressed current of the constant-current sources Q2 and Q3 must be adapted accordingly.

The circuit arrangement constructed according to the invention operates well with very low voltages. This is evident from the fact that the comparator V2 picks up if the voltage of the constant-current source Q1 exceeds a value of 20 mV.

The preferred embodiment of the invention described hereinabove is intended to be exemplary of the principles of the invention, and it is contemplated that the described embodiment can be modified or changed while remaining within the scope of the invention as defined by the appended claims.

I claim:

1. A tester for determining the operating condition of switch contacts by measuring the transfer resistance thereof with a low voltage, comprising:
   a bridge circuit, the arms of which comprise, respectively, the contacts being tested, a first reference resistor, the latter being connected through first coupling contacts and second coupling contacts, a first constant-current source having a positive terminal connected to a first terminal of said contacts being tested over third coupling contacts, fourth coupling contacts connecting a second terminal of said contacts being tested to ground, second reference resistor for supplying a reference voltage to said first reference resistor, second constant-current source having a positive output terminal connected to a first terminal of said second reference resistor and a terminal of said bridge circuit formed by a first junction point connecting said first reference resistor and said second coupling contacts, third constant-current source having a negative terminal connected to said first junction point, said third constant-current source being constructed to supply as much current as said first and second constant-current sources combined, first threshold voltage source, first comparator means having one input connected to said first junction point and another input connected to an output of said first threshold voltage source, second comparator means having an input connected to said first terminal of said second reference resistor and another input connected to a second junction point of said bridge circuit connecting said first coupling contacts and said first reference resistor, second threshold voltage source, and third comparator means having an input connected to said second threshold voltage source and another input connected to said positive output of said first constant-current source.

2. The tester defined in claim 1 wherein the resistance value of said first reference resistor is equal to that of said second reference resistor, and wherein the current output of said second constant current source is half as large as that of said first constant-current source.

3. The tester defined in claim 1 wherein said first, second and third comparators are operational amplifiers.

* * * * *